United States Patent Office 2,791,509
Patented May 7, 1957

2,791,509

METHOD OF PRODUCING ZEIN-COATED CONFECTIONERY

Horace B. Cosler, Evanston, Ill.

No Drawing. Application June 24, 1954,
Serial No. 439,167

13 Claims. (Cl. 99—166)

(Granted under Title 35, U. S. Code (1952), sec. 266)

The invention described herein, if patented, may be manufactured and used by or for the Government for governmental purposes without the payment to me of any royalty thereon.

This application is a continuation-in-part of my copending application Serial No. 350,780, filed April 23, 1953, now abandoned.

The present invention relates to a new and improved coating for non-cereal confectionery articles.

More particularly, it relates to a new and edible, nutritious coating for non-cereal confectionery articles such as candy or nuts and the like and the method of applying the same.

Certain foods such as confections like sugar burnt peanuts or almonds, certain types of caramels, butter creams, chocolate pan coated candies, hard candies, hard gum types and other candies often require a special coating to give them an appetizing appearance, and for protective purposes. Heretofore, the materials most often employed for these purposes have been "confectioner's glaze," mineral oil and certain natural gums and pectins.

To date, the most widely used coating for candies and the like has been the so-called "confectioner's glaze." This glaze consists primarily of shellac. Since this material is non-nutritive, it has been tolerated only in extremely limited quantities by the law. Heretofore, confectioner's glaze, although undesirable from a nutritional viewpoint, has been the only feasible material for imparting a bright, decorative and protective coating to candies.

Certain natural gums and pectins have been used as protective coatings for candies. These materials are somewhat operable as oil barriers but are not satisfactory in preventing a moisture exchange between an article coated thereby and the atmosphere. Another disadvantage of these natural gums and pectins has been their solubility in water, and insolubility in edible organic solvents. Accordingly, deposition of coatings of these natural gums and pectins in an aqueous solution on candies has been extremely detrimental to the confection because of the water solubility of the sugar in the candies.

Certain confections, especially the so-called "hard candies" become very sticky when exposed to increased humidity and temperature conditions. To avoid this, it has been necessary heretofore to pack such confections in airtight containers such as tin or glass. During storage, this method of packing hard candies is adequate. However, when the container is opened and exposed to the atmosphere, the problem of stickiness is again encountered.

By the present invention, it is possible to coat food articles such as confections, nuts or candy with an edible and nutritious material which not only imparts an attractive and decorative finish to the candy or nuts but also acts as an extremely efficient oil and moisture barrier. Further, when products such as hard candy or the like are coated with the material of the instant invention, they may be stored in open containers at increased temperature and humidity conditions for extended periods of time without the adverse effects of stickiness as was heretofore encountered.

The present invention is therefore particularly applicable to confectionery products which contain fats or oils and are, accordingly, subject to oxidative or other changes, including moisture absorption resulting in rancidity or staling.

In accordance with the foregoing, an object of the present invention is to provide an edible and nutritious coating for non-cereal confectionery articles.

Another object is to provide an edible, protective and decorative coating for candy and nuts.

Still another object is to provide an edible, nutritious, protective and decorative coating for candy which acts as a barrier for moisture and oil.

A further object is to provide an edible coating for candy which prevents the sticking together of individual pieces of candy at increased temperature and humidity conditions.

Other objects and advantages of the instant invention will be apparent to those skilled in the art from the following disclosure.

The edible and nutritious coating or glaze of the instant invention comprises primarily a mixture of zein and a saturated higher fatty acid or an acetylated glyceride ester of a saturated higher fatty acid.

Zein is a commercially available protein extracted from corn gluten. While it is similar to other proteins in regard to its chemical structure, it differs from most proteins in that it is relatively unreactive. Zein belongs primarily to the group of aqueous alcohol-soluble proteins commonly known as prolamines. Zein is available on the market as a light colored, amorphous, powdered solid of a specific gravity of 1.25 (25° C.), having a molecular weight of about 25,000, a softening point of about 180° to about 200° C. Zein has been shown to be remarkably resistant to the type of bacterial attack which frequently decomposes other proteinaceous materials. Further, it seems to be distasteful, if not repellent, to the Indian meal moth and other insects which often infest food articles such as nuts, cereal grains or the like, which are not protected in sealed containers. Zein, alone, tends to impart a lustrous, glossy finish to the surface of food articles coated with the substance. Not only is such a coating of zein advantageous in imparting a decorative coating to food articles; but it also has the further advantage of being an excellent barrier to fat migration. Zein does have, however, two distinct limitations as a coating material. First, zein does not bar the migration or transfer of moisture. Second, coatings of zein have a low tensile strength and are easily fractured.

I have found that by incorporating edible acetylated glycerides in the zein coating material, it is possible to increase the tensile strength of the zein coating and to impart a moisture barrier property thereto. In this manner, it is possible to provide a nutritious, edible, protective, and decorative coating for candies to replace the heretofore non-nutritious coatings which have been employed.

The acetylated glycerides which may be used in the present invention comprise any acetylated glyceride compounds displaying the following desirable properties:

(1) Are non-toxic;
(2) Have a melting point substantially greater than room temperature; that is, in a range of from about 100 to 130° F.;
(3) Are water insoluble;
(4) Are capable of acting as plasticizing agents in increasing the tensile strength of zein, and
(5) Are soluble in edible organic solvents.

Most acetylated glycerides display the majority of these desirable properties. These include mono- and di-glycerides; i. e. glyceride esters of saturated higher fatty acids, wherein two or one higher fatty acid radicals are replaced by an acetyl radical or radicals. I have found, however, that acetylated monoglycerides, such as acetylated monostearin give consistently good results. Among saturated higher fatty acids and their radicals, as these terms are employed in the present specification and claims, are stearic acid, palmitic acid, and their fat-forming homologs. Unsaturated acids, such as oleic acid, would degenerate into a fluid composition, if they were to replace the saturated fatty acid in its entirety in a composition according to the present invention; however, they are capable of being used in admixture with higher fatty acids. The same observation applies to mono- and diglyceride esters of unsaturated acids such as acetylated mono-olein or di-olein.

Suitable monoglycerides which can be acetylated for use in the instant invention can be obtained from such sources as technical grades of monoglycerides made from hydrogenated cottonseed oil, hydrogenated edible lard and similar sources. Commercial grades and pure grades of monostearin and monopalmitin may also be used.

In general, the acetylated monoglyceride compositions which are preferably employed in the present invention comprise either—

(a) A technical grade glyceride composition containing less than about 90% acetylated monoglycerides, by weight, or (b) A pure monoglyceride composition which is only partially acetylated; that is, acetylated to less than about 90% by weight.

An example of the first type—that is, a technical grade glyceride composition containing less than 90% monoglycerides—is obtained from completely hydrogenated vegetable oils. Completely hydrogenated vegetable oil can be converted into a monoglyceride by reacting it with a small excess of glycerol in the presence of a catalyst such as sodium hydroxide, which results in a mixture containing principally mono-glycerides and di-glycerides; this mixture can be easily separated, e. g. by fractionation, into monoglycerides and diglycerides, respectively, when desired (see R. O. Feuge and A. E. Bailey, Oil and Soap, 1946, vol. 23, page 259). However, an unfractionated mixture of mono- and di-glycerides containing about 50–60% monoglycerides by weight, when acetylated as hereinafter explained, is suitable for the purposes of the present invention. Acetylation of such a product produces an acetylated monoglyceride composition which may be advantageously employed in the instant invention, the process of acetylation is set forth in an article by R. O. Feuge, E. J. Vicknair and N. V. Lovegren in Journal of the American Oil Chemists' Society, 1953, vol. 30, page 283.

An example of the second type—that is, a pure monoglyceride—is pure monostearin or mixtures of pure monostearin and pure monopalmitin. Partial acetylation of such a composition—that is to less than about 90% acetylated monoglycerides by weight—yields a composition which may also be advantageously employed in the instant invention.

Acetylation of the monoglyceride composition may be effected by any one of several well known methods and does not constitute part of the present invention. A typical method of acetylating glycerides, for example, is as follows:

Acetylated monoglyceride products, such as acetylated monostearin, which are true fats, are prepared by a relatively simple procedure. For example, monostearin and an amount of acetic anhydride ranging from 15% to 180% by weight of the monostearin used are allowed to react for one hour at about 230° F. Because the reactants form a homogeneous solution, very little mixing or agitation is required. The reaction is stopped by adding water to the hot reaction mixture.

The term monostearin used above includes technical grade monoglycerides made from completely hydrogenated cottonseed oil, as well as commercial grades of monostearin and pure monostearin.

The aforementioned reactions can all be carried out in a glass or stainless steel vessel which may be opened to the air or vented through a condenser. When large batches of acetylated monoglyceride products are being prepared, the reaction vessel should preferably be provided with a cooling coil or other means of cooling the charge. The acetylation reaction is exothermic (generates heat) and the reaction between the excess acetic anhydried and the water used to stop acetylation is also exothermic. Therefore, violent boiling may occur if the temperatures are not controlled. After the acetylation reaction has been stopped by the addition of water, the reaction product is washed by stirring with batches of water, settling and decantation until it is free of acetic acid.

The washed product is dried in any one of a number of ways; for example, heating the product under a partial vacuum and bubbling an inert gas through the product is satisfactory.

The washed and dried acetylated monoglyceride product possesses only slightly more taste, odor and color than does the original monostearin. If desired, the acetylated monostearin product may be bleached with activated carbon, or clay, like any other fat, and it can be deodorized by the conventional procedure used for edible fats except that a relatively low deodorization temperature (350° to 450° F.) must be employed. When carefully prepared and purified, acetylated monoglycerides possess practically no odor, taste or color.

Acetylated monoglycerides prepared in this manner are solid, non-greasy compositions displaying a high degree of plasticity. They are extremely resistant to rancidity, having a hydroxyl value of about 141 and a peroxide value of only about 2. Accordingly, they are quite resistant to oxidation. The melting point of these compositions lies in a range of from about 90° to 140° F. that is, substantially higher than ordinary environmental temperatures.

The desirability of employing monoglyceride compositions containing less than 90% acetylated monoglycerides lies in the melting point temperatures and plastic or tensile strength properties of such compositions. For example, an acetylated monoglyceride composition obtained by acetylating a reaction product of glycerol and completely hydrogenated cottonseed oil (monoglyceride content approximately 60%) has a melting point of about 130° F. and a tensile strength such that at room temperature the composition may be stretched several hundred percent before breaking. A monoglyceride composition containing more than 90% acetylated monoglycerides, on the other hand, has a melting point less than 100° F. and a relatively poor tensile strength. Accordingly, the latter composition is less desirable as an additive to zein.

Besides others, monoglyceride composition containing less than about 90% acetylated monoglycerides by weight display the following desirable properties: Nontoxic; non-greasy; high tensile strength, that is, are quite plastic even at low temperatures; short melting range; controllable melting point which is greater than room temperature, usually between 100° F. and 130° F.; high resistance to rancidity or oxidation; are water insoluble; and are soluble in edible organic solvents.

The coating mixture comprising zein and acetylated glycerides is preferably applied to the food articles in an edible organic solvent vehicle, such as ethanol and the like. For example, 90% ethanol, or ethanol denatured with a minor portion of ethyl acetate may be employed as a solvent. Virtually, any organic solvent may be used which is edible, that is non-toxic, and in which the zein and acetylated monoglyceride are soluble. Such solvents as alcohols containing from two to four carbon atoms may be used. Mixtures of such alcohols which secondary solvents such as any non-toxic denaturant permitted by law in food products may also be employed. For example, "Permit Formula 35" which contains 35 parts by volume of ethyl acetate to 100 parts by volume of ethyl alcohol, or "Permit Formula 35a" containing 5 parts of ethyl acetate by volume to 100 parts of ethyl alcohol by volume may also advantageously be used as the solvent.

Since zein and acetylated glycerides are both soluble in ethanol and other edible organic solvents, the coating of confections with such a mixture does not dissolve the sugar and other water soluble components contained in the candies. Further, evaporation of most edible organic solvents is extremely rapid and easily accomplished. This makes the coating process both practical and economical. Indeed, the cost of my coating material and method is substantially the same as the cost of the confectioner's glaze now in use.

The amount of acetylated monoglycerides incorporated into a zein coating mixture is not critical and may vary from about 10% to 50% of the total solids present in the coating, depending on the properties desired in the coating. For example, a coating which is intended to be primarily decorative can contain less acetylated monoglyceride than a coating which is intended to be protective as well as decorative. With regards to zein and acetylated monoglycerides alone, a general purpose coating for candy, that is protective as well as decorative, preferably contains about three parts of zein to about one part of the acetylated monoglyceride composition.

On a solution basis—that is a mixture of zein and an acetylated monoglyceride composition dissolved in an edible organic solvent—the amount of acetylated monoglyceride may vary from about 1 to 10% of the solution by weight. Again, the amount depends on the type of coating desired. I have found, however, that about 5% gives consistently good results.

In concentrations from 1 to 10% of the solution, acetylated monoglycerides are completely soluble. At concentrations in excess of 10%, however, acetylated monoglycerides are only partially soluble and tend to form emulsions. Accordingly, when mixtures containing greater than 10% acetylated monoglycerides are employed, the mixture must be agitated during application to insure uniform deposition on the food articles being coated.

That acetylation of the monoglycerides is important is well evidenced by the fact that non-acetylated materials do not impart the same moisture barrier properties to zein, nor do they improve the tensile strength of the coating. Other plasticizing agents such as non-acetylated glycerides, oleic or like unsaturated fatty acids or mixtures thereof do not impart the same desirable plasticizing and moisture barrier properties to zein. Such materials are only slightly soluble in zein solutions at ordinary temperatures, and increase rather than decrease the viscosity of a zein solution. Accordingly, they must always be used in an emulsion form and do not have the same satisfactory properties as the acetylated glycerides.

If desired, from about two to five parts of powdered carnauba wax, beeswax or some other edible wax may be added to the zein-acetylated glyceride solution as a polishing substance. This inclusion of wax in the coating mixture is especially desirable when coating such confections as jelly beans, cinnamon imperials or the like, which are customarily polished. The wax, however, is not soluble in ethanol and must be kept in emulsion form by agitation.

Any method normally used in coating food articles may be employed with the novel composition of the instant invention. For example—

The coating mixture may be applied to food articles such as candy by tumbling the articles to be coated in revolving pans and adding the solution in the proper amounts to the tumbling confections. Alternatively, the solution may be sprayed on the articles while they travel on a wire belt. The coated confections can be air dried or dried by forced, conditioned air.

The amount of coating is optional, depending upon the purposes for which it is employed. For example, merely decorative, high gloss coatings can be thinner than the coatings intended solely for protective purposes. The only requirement is that the coating be continuous. Standard coating thicknesses, that is, of from about 0.5 to 10 mils and greater in thickness, as presently employed for candies and the like are quite adequate. Stated in another manner, the coating should comprise from about 0.3% to 2% of the finished coated food article by weight. The following examples given by way of illustration only, and not by way of limitation, more clearly describe the method employed in the present invention:

*Example 1*

The following coating mixture solution was prepared:

| Ingredient: | Parts by weight |
| --- | --- |
| 90% denatured ethanol (permit 35a) | 120 |
| Zein | 50 |
| Acetylated monostearin (melting point 110° F.) | 15 |

Vanillin, essential oils or other flavoring ingredients may be used.

Enough of this solution was added to sugar coated burnt peanuts in a revolving pan to provide approximately 0.4 percent of the total weight as finished coating. After the sugar coated burnt peanuts had been sufficiently tumbled to impart a continuous coating of the zein-acetylated glyceride mixture to each peanut, the candy was removed from the pans and air dried. The finished product was comparable in appearance to the same product coated with confectioner's glaze. The coating thus obtained gave a decorative gloss comparable to prior coatings and effected a good moisture and oil barrier.

*Example 2*

The same pan-coating procedure was followed as in Example 1 employing chocolate candy pieces. A finished product was realized in this case which was comparable in appearance to the same product coated with confectioner's glaze.

*Example 3*

A solution was made as follows:

| Ingredient: | Parts by weight |
| --- | --- |
| 90% denatured alcohol (Permit 35a) | 120 |
| Zein | 50 |
| Acetylated monoglyceride (melting point 110° F.) | 15 |

Flavoring material may be added if desired.

Enough of this solution was added to buttercreams (candy corn and Halloween creams) to provide approximately 0.5 percent of the total weight as the finished coating. The candies were tumbled in revolving pans until completely coated and were air dried. The coated candies were bright in appearance. When placed in tight jars and kept at 100° F. for 24 hours, the buttercreams coated with this material were loose in the jar, while buttercreams from the same lot, coated with confectioner's glaze were set and starting to stick together. In this case, the coating was both decorative and protective.

*Example 4*

The same solution as employed in Example 3 was added to hard gum confections in a revolving pan until the solution added was equal to approximately 0.5 percent of the total weight as finished coating. The hard gum candies were tumbled until each article was completely coated. The coated candies after being air dried were bright in appearance. The finish was dry and stable, which is not the case when mineral oil is used as in other methods. When these coated candies were kept at 100° F. for 24 hours or longer, the finish did not disappear and the candies did not stick together as is often the case with such coatings as mineral oil and the like. Again, in this case, the coating was both decorative and protective.

*Example 5*

Enough of the solution employed in Example 3 was added to plastic filled hard candy and solid, hard candy in a revolving pan to provide approximately 0.5 percent of the total weight as finished coating. These candies were tumbled until each piece was completely coated with the zein-acetylated glyceride mixture. After air drying the coated candies had a very bright appearance. The candies so coated were kept in open containers along with uncoated hard candies from the same lots. Temperature and humidity conditions were varied from 95° F. with 65 percent relative humidity to 60° F. with 40 percent relative humidity for more than one month. At the high temperatures and high humidities, the uncoated hard candies became very sticky and tended to stick together as an agglomerated mass; remaining stuck together even after the temperatures and humidity were lowered. The hard candies coated with the zein-acetylated glyceride mixture of the instant invention, however, remained loose and showed no tendency to stick. In this case, the coating was protective only.

*Example 6*

The solution employed in Example 1 was modified by adding enough "Tenox N," which comprises butylated hydroxyanisol and nordihydroguaiaretic acid, to provide 0.1% antioxidant based on the total oil content of pecans, which were coated by a pan-coating procedure. Sufficient solution was applied to provide approximately a 1% coating by weight on the pecans on a dry basis. The pecans were placed in a room at 100° F. in loosely covered jars to provide an accelerated test. By way of comparison, uncoated pecan pieces from the same lot were also placed in the room at 100° F. in loosely covered jars. Taste tests were applied to the pecans prior to storage and at intervals up to 25 days. In the taste test prior to storage, the uncoated pecans rated slightly higher than the coated pecans. After 9 days of storage at 100° F., the coated and uncoated pecans were rated equally. After 25 days of storage at 100° F., the coated pecans were rated equal in taste acceptance to the ratings after 9 days' storage, while the uncoated pecans were rated as of doubtful acceptance. The uncoated pecans were soggy and rancid and produced a bad after-taste. The coated pecans still retained their crispness and sweet taste.

The following examples illustrate confectionery coatings which comprise zein plasticized with a saturated higher fatty acid, preferably in the presence of an antioxidant.

|  | Example 7 (parts by wt.) | Example 8 (parts by wt.) |
| --- | --- | --- |
| Zein | 100 | 100 |
| Stearic Acid | 25 | 18 |
| Oleic Acid |  | 7 |
| Ethanol (90%) | 240 | 240 |

To one gallon of either of the above solutions, 0.7 ounce of Tenox N is added as an anti-oxidant. Tenox N is butylated hydroxyanisole (BHA), nordihydroguiaretic acid (NDGA), citric acid and propylene glycol. It has been found that the antioxidant should amount to no more than 0.02 percent (BHA and NDGA dry basis) of the fat content of the nuts, as a higher percentage of antioxidant is of no benefit and is wasted. Another nontoxic antioxidant which might be used is the same proportion is Tenox II (butylated hydroxyanisole; anisole being phenyl methyl ether, $C_6H_5.O.CH_3$). In lieu of stearic acid or stearic-oleic acid mixtures, I may employ palmitic acid, preferably mixed in the desired proportions with stearic and oleic acid. A large percentage of oleic acid will obviously result in a more fluid coating. The fluidity of the coating will be varied to suit the climate where the nuts are to be shipped. In lieu of 90% ethanol, I may use ethanol denatured by adding 35 volumes of ethyl acetate to 100 volumes of ethanol (Permit Formula No. 5) or by adding 5 volumes of ethanol acetate to 100 volumes of ethanol (Permit Formula No. 35a). The nuts may be sprayed with the solution and agitated to insure thorough coating, or they may be dipped, removed and drained, or other known methods may be used to apply the coating. The solvent must be removed by evaporation to deposit the plasticized film of zein on the nuts; again, known apparatus may be used.

The final nut product was calculated to include 98% nut meat, 2% by weight of zein coating. Theoretically the coating need only have a thickness of 0.5 mil, but actually, as determined by laboratory examination, the coatings varied from 0.5 mil to 10.0 mils in thickness. The coated nuts are ready for packaging as soon as the coating has been applied as described. Ordinary cardboard, cellophane and similar non-airtight containers may be used when marketing the described coated nuts, with consequent savings of considerable importance.

It will be appreciated by those skilled in the art that I have now provided a new, edible and nutritious coating for food articles, such as confections, which is not only decorative but also protective.

It will also be appreciated by those skilled in the art that certain changes and modifications may be effected in the instant invention without changing the novel scope thereof.

I therefore intend that such changes and modifications be deemed to be included within the scope of my invention, which I now define by the subjoined claims.

I claim:

1. A method of applying a firmly adhered non-sticky edible protective surface coating to a non-cereal fat-, oil-, or moisture-containing confectionery, comprising dissolving zein and as a plasticizer therefor an acetylated glyceride ester of a saturated higher fatty acid in a non-toxic evaporable mutual organic solvent for said zein and ester, said ester being substantially more soluble in said solvent than said acid, applying the solution thus formed to said confectionery, and removing said solvent; whereby a continuous barrier against the penetration of water into said confectionery and against the penetration of fat, oil and moisture from the interior of said confectionery to the outside is provided.

2. The method according to claim 1 wherein said plasticizer has a melting point of at least about 100° F.

3. The method according to claim 1 wherein said plasticizer is acetylated monostearin.

4. The method according to claim 1 wherein said plasticizer is acetylated monopalmitin.

5. The method according to claim 1 wherein said plasticizer is acetylated monostearin having a melting point of at least about 100° F.

6. The method according to claim 1 wherein said confectionery is a shelled nut.

7. The method according to claim 1 wherein said plasticizer is present in an amount not exceeding the amount of said zein.

8. The method according to claim 1 wherein a nontoxic antioxidant is dissolved in said solvent together with said zein and plasticizer.

9. The method according to claim 1 wherein said solvent is ethanol.

10. The method according to claim 1 wherein said confectionery is chocolate candy.

11. A method of applying a firmly adhered non-sticky edible protective surface coating to a sugar-coated non-cereal, fat-, oil-, or moisture-containing confectionery, comprising dissolving zein and as a plasticizer therefor an acetylated glyceride ester of a saturated higher fatty acid in a non-toxic evaporable mutual organic solvent for said zein and ester and in which sugar is not more than sparingly soluble, said ester being substantially more soluble in said solvent than said acid, applying the solution thus formed to said confectionery, and removing said solvent; whereby a continuous barrier against the penetration of water into said confectionery and against the penetration of fat, oil and moisture from the interior of said confectionery to the outside is provided.

12. The method according to claim 11 wherein said solvent is ethanol.

13. The method according to claim 11 wherein said confectionery is a sugar-coated shelled nut.

References Cited in the file of this patent

UNITED STATES PATENTS

| | | |
|---|---|---|
| 2,218,713 | Kelley et al. | Oct. 22, 1940 |
| 2,475,133 | Furter et al. | July 5, 1949 |
| 2,508,477 | Stievater et al. | May 23, 1950 |
| 2,614,937 | Baur et al. | Oct. 21, 1952 |
| 2,615,159 | Jackson | Oct. 21, 1952 |
| 2,631,938 | Miers et al. | Mar. 17, 1953 |